United States Patent [19]

Hood et al.

[11] 4,004,125
[45] Jan. 18, 1977

[54] MULTIHEAD WELDING GUN

[75] Inventors: Ben B. Hood, Valrico; Raymond H. Glatthorn, St. Petersburg, both of Fla.

[73] Assignee: Westinghouse Electric Corporation, Pittsburgh, Pa.

[22] Filed: Aug. 14, 1975

[21] Appl. No.: 604,750

[52] U.S. Cl. ............................................. 219/125 R
[51] Int. Cl.[2] ............................................ B23V 9/12
[58] Field of Search ............................... 219/125 R

[56] References Cited

UNITED STATES PATENTS

| 3,643,059 | 2/1972 | Hill | 219/125 R |
| 3,740,520 | 6/1973 | Daughenbaugh | 219/125 R |

*Primary Examiner*—E. A. Goldberg
*Attorney, Agent, or Firm*—F. J. Baehr, Jr.

[57] ABSTRACT

A multihead welding gun which has one or more self-aligning heads for simultaneously forming 360° welds between the juncture of recessed tubes and a tube sheet.

10 Claims, 3 Drawing Figures

MULTIHEAD WELDING GUN

BACKGROUND OF THE INVENTION

This invention relates to automatic welding equipment and more particularly to a multihead welding gun, which simultaneously produces a plurality of seal welds at the juncture of a plurality of tubes with the tube sheet.

In heat exchangers such as nuclear steam generators, wherein it is necessary to ensure a leakless joint between the tubes and the tube sheets, rolling or expansion of the tubes into the tube sheet does not provide assurance of a leakproof juncture so that the tubes are generally seal welded to the tube sheet. To improve the uniformity of the welds and control the penetration, the molten puddle solidification and the bead sag, automatic welding has been utilized, however, the weld guns hereinbefore utilized could only make one weld at a time. To make multiple welds is a problem as the ligaments between tubes varies to a degree that multifixed head guns would not produce acceptable welds, each weld head must be axially aligned with the tube to be welded within a tolerance, which is much smaller than the economical tolerance of the pitch of holes in a tube sheet.

SUMMARY OF THE INVENTION

In general, a multihead welding gun for welding tubes to a tube sheet, when made in accordance with this invention, comprises a plurality of non-consumable electrodes, means for blanketing the area around the electrodes with a suitable gas, at least one housing, a plurality of spool members, each spool member having an electrode eccentrically disposed therein. Each of the spool members is rotatably mounted and has means disposed therein for axially aligning the spool member with the tube. The multihead gun further comprises means for rotating the spool members, whereby the electrodes generally circumscribe the adjacent tube to tube sheet juncture. At least one of the spool members is so disposed to have its axis of rotation movable, and a face-plate cooperatively associated with the housing and a backup plate generally disposed parallel to the faceplate. The multihead weld gun also comprises means insertable in a tube, which cooperates with the plates to position each electrode adjacent a tube to tube sheet juncture and to lock the movable spool member in a fixed position essentially in axial alignment with a tube to produce a multiplicity of welds between the tubes and tube sheets.

BRIEF DESCRIPTION OF THE DRAWINGS

FIG. 3 is a partial sectional view taken on line III—III of FIG. 2.

DESCRIPTION OF THE PREFERRED EMBODIMENT

Figure 1:
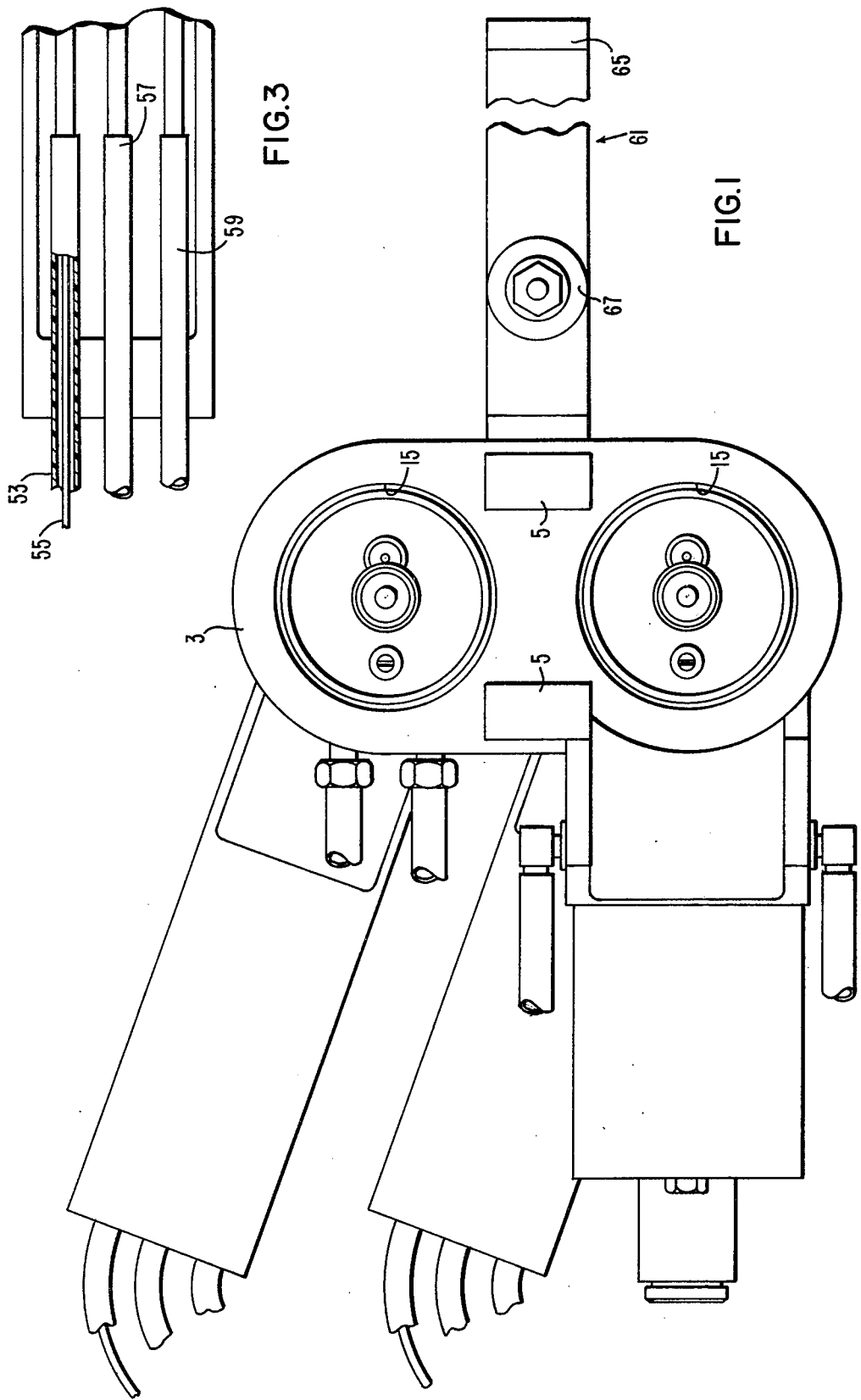
FIG. 1 is a plan view of a multihead welding gun for welding a plurality of tubes to a tube sheet made in accordance with this invention.
Figure 2:
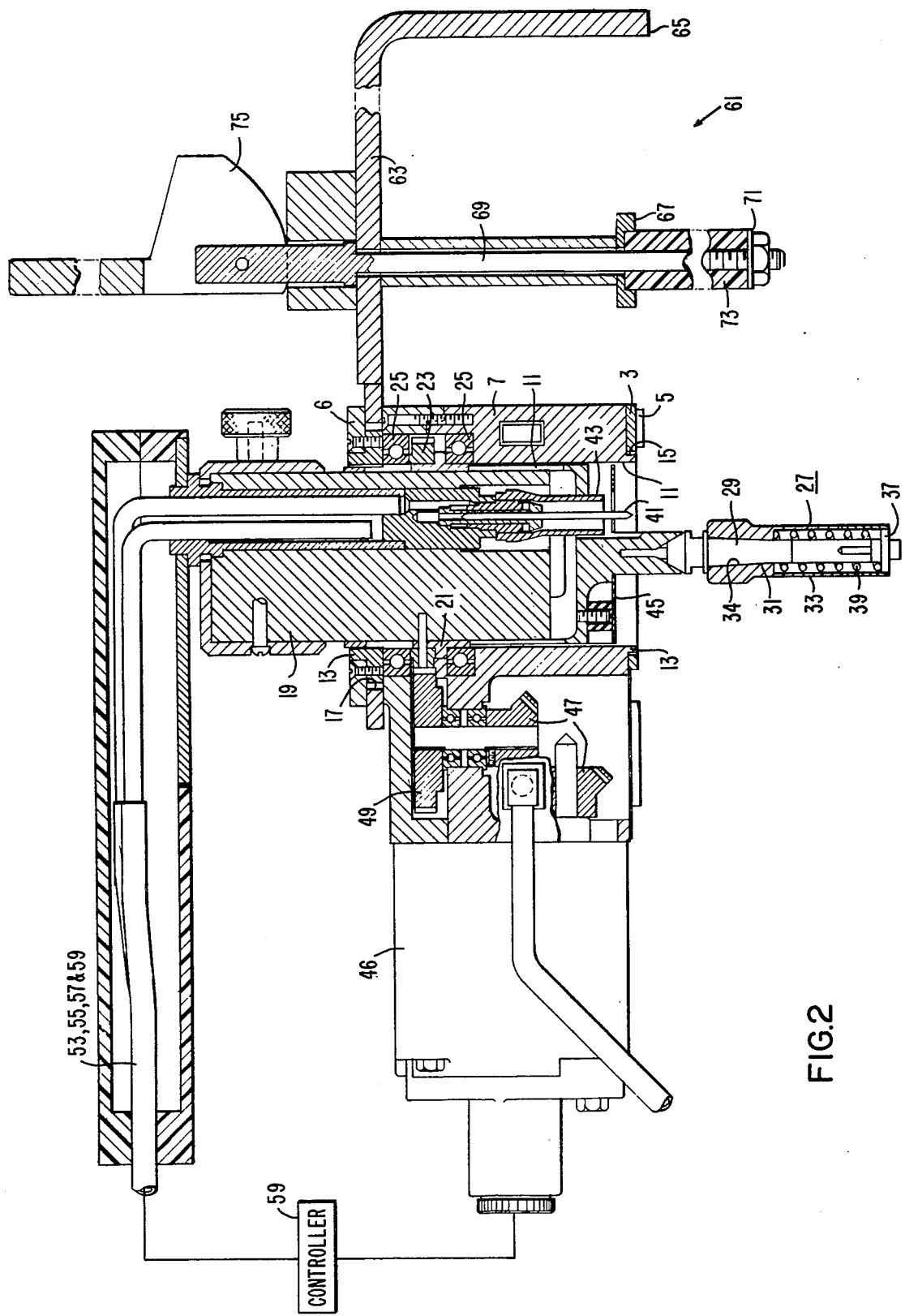
FIG. 2 is a sectional view taken on line II—II of FIG. 1.

Referring now to the drawings in detail, FIGS. 1 and 2 show a multihead welding gun 1 for welding a plurality of recessed tubes to a tube sheet at the juncture of the tubes and tube sheet. The multihead welding gun 1 comprises a faceplate 3 having locating lugs or pads 5 disposed thereon in such a manner to provide a plurality of surfaces, which contact the tube sheet and align the faceplate 3 generally parallel thereto and establish a predetermined distance therebetween. A backup plate 6 is generally disposed parallel to the faceplate 3. A plurality of two-piece housings 7 are disposed between the plates 3 and 6. The housings 7 have a bore 11 extending therethrough and a collar 13 adjacent each end of the bore 11.

The plates 3 and 6 have openings 15 and 17, respectively, which receive the collars 13. At least one, however, in the embodiment shown, all of the openings are slightly larger than the collar in order to allow the axis of the bore of the housing to move and yet remain generally normal to the plates 3 and 6. The openings 15 and 17 can be oblong generally allowing the axis of the bore to move in a plane or the openings 15 and 17 can be larger in diameter than the collars 13 permitting the axis of the bore to move in any direction and still remain generally normal to the plates 3 and 6.

A rotor member 19 is rotatably disposed in each bore 11 and has a circumferential flange 21 extending outwardly adjacent the central portion of each rotor member 19. A spur gear 23 and a pair of bearings 25 are disposed adjacent the flange 21. The flange 21 and bearings 25 are clamped within the two-piece housing 7 to locate the rotor member 19 within the housing and allow it to rotate freely therein.

A spindle 27 is disposed on the rotor member 19 in order to provide means for axially aligning the rotor member 19 with a tube. The spindle 27 comprises a shaft 29 having a tapered portion 31. The shaft 29 is so disposed on the rotor member 19 as to extend outwardly therefrom and be coaxial therewith. A sleeve 33 is disposed over the shaft and has a tapered portion 34 which slidably engage the tapered portion 31 of the shaft. The sleeve 33 also has a plurality of kerfs 35, which are disposed to allow a portion of the sleeve 33 to expand outwardly into engagement with a tube and axially align the spindle with the tube as the tapers 31 and 34 slide with respect to each other. A washer 37 is disposed on the distal end of the shaft 29 and a spring 39 is disposed over the shaft 29 and cooperates with the washer 37 to bias the sleeve 33 so that the tapered surfaces 31 and 34 are in engagement and tend to expand the end of the sleeve 33 having the kerfs 35.

A non-consumable electrode 41 is eccentrically disposed in the rotor member 19. The central portion of the rotor member 19 is made of an electrically insulating material to electrically insulate the electrode from the rotor member and housing.

A tubular member 43 surrounds a portion of the electrode and forms a chamber adjacent the tip of the electrode 41. A suitable gas is supplied to the chamber in the tubular member 43 at a pressure sufficient to blanket the arc produced by the electrode.

An adiabatic shield 45 is disposed adjacent the rotor member 19 and is interposed between the arc and the rotor member 19 to reduce the heat transferred from the arc to the rotor member 19.

At least one of the housings 7 has an electric motor 46 or other driving device connected thereto. A gear train is cooperatively associated with the electric motor and provides means for rotating the rotor member 19. The gear train comprises a pair of bevel gears 47 which drive a pinion gear 49, which in turn engages the spur gear 23 on the periphery of the rotor member 19. In the embodiment shown, a single drive motor 46 is employed and an idling gear is disposed between the spur gear 23 to drive the rotor member 19, however, it should be understood that each rotor may be individually driven by a separate drive motor.

A controller 59 is provided to energize the motor 46 and thus cause the spindle to rotate in excess of 360°. The controller 59 also initiates power to the electrode forming arcs which weld the adjacent tube to the tube sheet. The controller 59 may supply power to the electrode before the rotor member 19 begins its rotation and the power may be supplied in any applicable form to produce an acceptable field weld.

The electrode 41 and tubular member 43 are rotatably disposed in the rotor member 19 allowing cooling medium and power to be supplied to the rotor member and electrode without tangling lines and conduits 53, 55, 57 and 59, which bring in cooling water, power, inert gas and remove heated water, respectively.

As shown in FIG. 3 the power supply line 55 is disposed within the inlet cooling water supply conduit 53 in order to cool the power line when the welding gun is being operated.

Generally indicated at 61 is means insertable in a tube which cooperates with the faceplate 3 and backup plate 6 to position the electrode 41 adjacent a tube-tube sheet juncture and lock the movable spindle 27 in a fixed position. The locking means 61 comprises a bracket 63 fastened to the backup plate 6 by welding or other means. A first locating surface 65 is disposed to contact the tube sheet and a second locating surface 67 is disposed between the first locating surface 65 and the faceplate 3. The second locating surface 67 is also disposed to contact the tube sheet and form a bucking surface. A rod 69 extends generally normal to the second locating surface 67. The rod 69 has a washer 71 attached to the distant end thereof and an elastomer sleeve 73 fits over the rod 69. The sleeve 73 is slightly smaller in diameter than the tube opening so as to fit freely therein. One end of the sleeve 73 is disposed to abut the washer 71 and the other end abuts the bucking surface supported by the bracket 63. A cam 75, or other means, is attached to the rod 69 and is operable to pull the washer toward the bucking surface attached to the bracket 63 to compress the elastomer sleeve 73 axially and thereby expand it into radial engagement with the inside of the tube. The cam 75 while compressing the elastomer sleeve 73 simultaneously exerts a force through the bracket 63 to the backup plate 6 causing it to clamp the housing 7 between the backup plate 6 and faceplate 3 locking the housing 7 so that the spindles 27 are axially aligned with the tubes.

The operation of the multihead welding gun 1 is generally as follows:

The spindles 27 are inserted into tubes which are to be seal welded to the tube sheet, since the rotor members 19 on which the spindles 27 are mounted are free to move, the spindles 27 can be inserted into an adjacent tube even though the pitch between tubes varies within the normal manufacturing tolerance. The elastomer sleeve 73 is simultaneously inserted into an adjacent tube and the gun is pushed up flush against the tube sheet whereby the locating surfaces or pads are engaging the tube sheet. The sleeves 33 on the spindles 27, being biased by the spring 39 to their expanded positions, automatically align the spindle 27 and spool member 19 with its associated tube as the gun is being pushed flush against the tube sheet. The cam 75 is then actuated pulling the rod 69 through the elastomer sleeve 73 causing the washer 71 to compress the elastomer sleeve 73, whereby it expands radially into engagement with its associated tube. Simultaneously, the backup plate 6 is pushed toward the faceplate 3 by the cam 75 locking the spindles 27 and rotor members 19 in axial alignment with their associated tubes. The controller 59 is actuated causing power to be supplied to the electrodes 41 and the motor 46; an arc is produced between the electrode and the tube and tube sheet, producing a weld at the juncture of the tube sheet and tube; and as the spindle 27 and rotor 19 begin to rotate the arcs circumscribe the juncture between the tube and tube sheet forming a 360° seal weld therebetween. Thus a plurality of tubes are simultaneously welded to the tube sheet.

The multihead welding gun hereinbefore described advantageously allows each electrode to independently circumscribe a weld excursion irrespective of the tube ligament displacement and ensures control of penetration, molten puddle solidification, weld bead sag and weld uniformity. While this embodiment describes a gas tungsten welding apparatus it is understood that it may also be utilized with plasma, electron beam and pulse arc welding systems.

What is claimed is:

1. A multihead welding gun for welding tubes to a tube sheet, said multihead welding gun comprising a plurality of non-consumable electrodes, means for blanketing the area around said electrodes with a suitable gas, a plurality of housings, a plurality of rotor members, each rotor member having one of said electrodes eccentrically disposed therein, each of said rotor members being rotatably mounted and having means disposed thereon for axially aligning said rotor members with a tube, means for rotating said rotor members whereby said electrodes generally circumscribe the adjacent tube-tube sheet junctures, at least one of said housings being movable so that the axis of rotation of the associated rotor member is movable, a faceplate cooperatively associated with said housings and a backup plate generally parallel to said faceplate, means insertable in a tube which cooperates with said plates to position each electrode adjacent a tube-tube sheet juncture and lock said movable housings in a fixed position whereby the axis of rotation of the rotor members are essentially in axial alignment with the associated tube.

2. A multihead welding gun as set forth in claim 1 wherein the housing has ducts through which cooling fluid can be passed.

3. A multihead welding gun as set forth in claim 1, wherein the rotating means and power to the electrodes are automatically controlled to produce 360° welds at the tube-tube sheet junctures adjacent the electrodes.

4. A multihead welding gun as set forth in claim 1, wherein the means for blanketing the area around the electrode comprises a chamber surrounding a portion of each electrode and means for supplying a suitable gas to said chamber at a pressure greater than one atmosphere.

5. A multihead welding gun as set forth in claim 1 and further comprising a plurality of housings, each housing having a rotor member disposed therein and having cooling ducts through which cooling fluid is circulated.

6. A multihead welding gun as set forth in claim 5, wherein the face and backup plates are cooperatively associated to join the housings into a unitary assembly.

7. A multihead welding gun as set forth in claim 1, wherein the means for axially aligning the rotor members comprising a shaft having a tapered portion, a sleeve also having a tapered portion which slidably engages the tapered portion of the shaft, means for biasing the tapered portions into engagement, the sleeve having a plurality of kerfs disposed to allow a portion of the sleeve to be expanded outwardly as the tapered portions are biased into engagement, whereby the shaft and rotor member are axially aligned with the tube, when the sleeve member is forced therein.

8. A multihead welding gun as set forth in claim 1, wherein the means for rotating said spindles comprises an electric motor, a pinion gear driven by said motor and a spur gear disposed adjacent the peripheral surface of each rotor member, the gears forming a train which rotates the rotor member.

9. A multihead welding gun as set forth in claim 1, wherein the means insertable into a tube comprises a longitudinally movable shaft, a flange extending radially outwardly from the distant end of said shaft, an elastomer sleeve, a bucking surface abutting said elastomer sleeve and means for pulling said shaft through said sleeve and toward said bucking surface to axially compress said sleeve and thereby expand it into radial engagement with a tube and simultaneously cooperate with the plates to lock the rotor members in axial alignment with their associated tubes.

10. A multihead welding gun as set forth in claim 9, wherein the means for pulling said shaft toward said bucking surface is a cam.

* * * * *